July 14, 1970  H. B. SPENCER  3,520,608
TESTING TOUGHENED GLASS FOR INTERNAL STRESSES
Filed Sept. 12, 1967  2 Sheets-Sheet 1
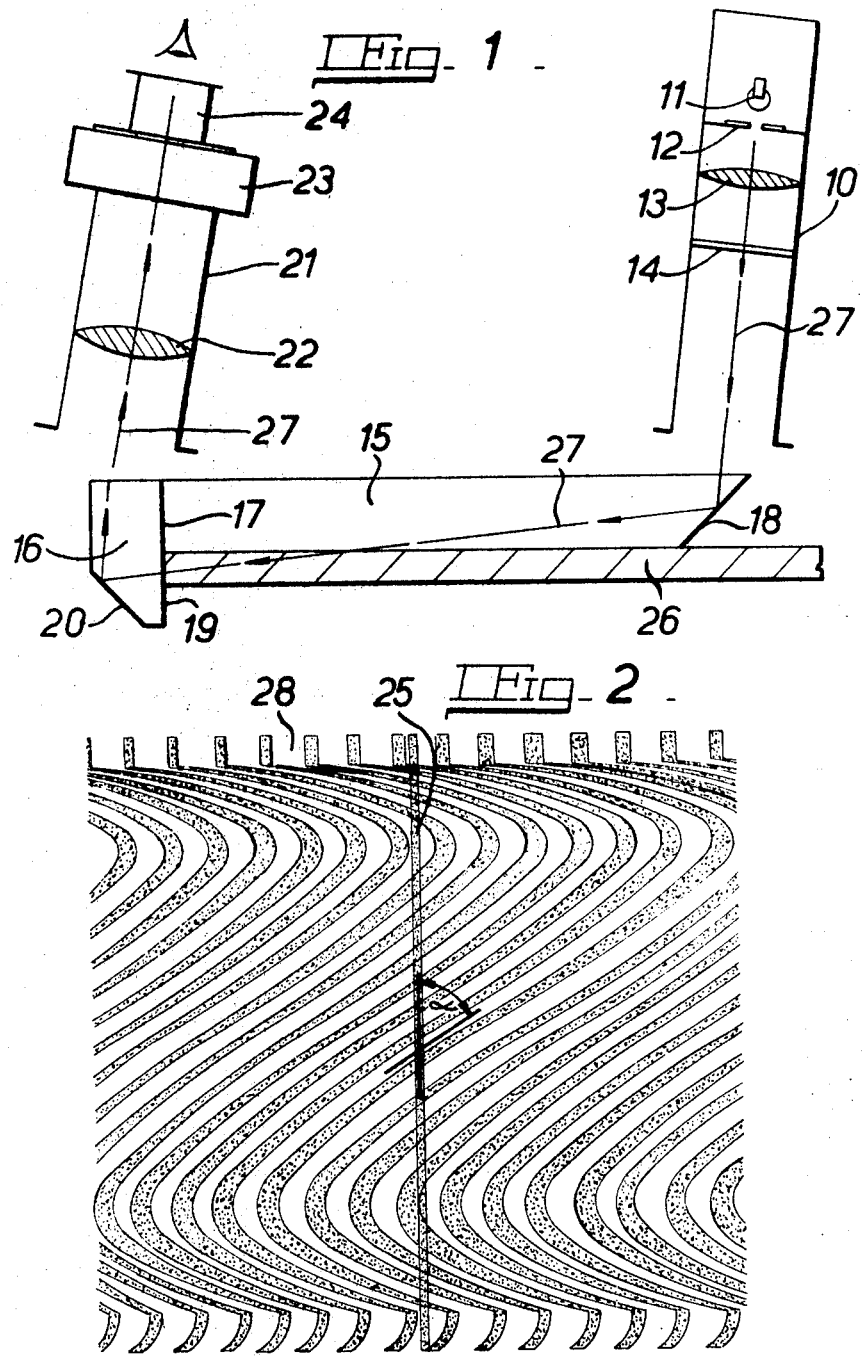

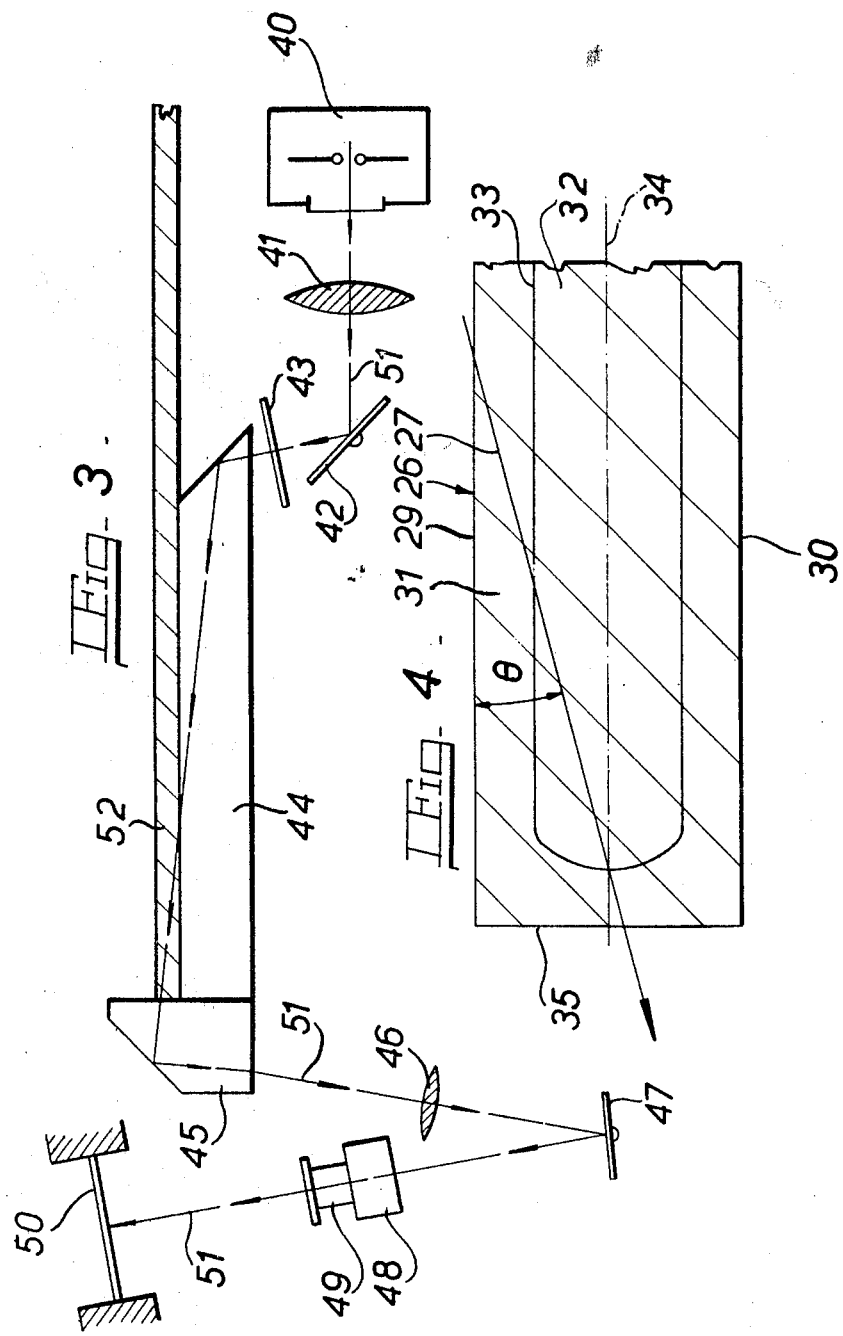

United States Patent Office 3,520,608
Patented July 14, 1970

3,520,608
TESTING TOUGHENED GLASS FOR
INTERNAL STRESSES
Henry B. Spencer, Coventry, England, assignor to The
Triplex Safety Glass Company Limited, London, England, a British company
Filed Sept. 12, 1967, Ser. No. 667,166
Claims priority, application Great Britain, Sept. 13, 1966,
40,754/66
Int. Cl. G01b 11/16
U.S. Cl. 356—35            5 Claims

ABSTRACT OF THE DISCLOSURE

The invention provides a method and apparatus for determining the stresses at intermediate layers in toughened glass. A beam of polarized light is passed along a path inclined at a small angle to one of the main surfaces of the glass, the path extending through this main surface and through an edge surface of the glass. The beam is polarized so that a first component is parallel with said main surface and a second component is at right angles to the first component. The emergent light is analyzed and provides a measure of the stresses at intermediate layers in the glass. The beam of light may be led into and from the glass by appropriate prisms.

---

This invention is concerned with a method of testing toughened glass and with apparatus for carrying out this method. The invention has been developed for use in testing windscreens and other body lights made of uniformly toughened glass, for use in sea and land vehicles and in aircraft. The invention can, however, be used in testing other products made from uniformly toughened glass, provided that they consist of or include a substantially flat strip of toughened glass terminating at one end in an edge surface. The strip may form part of a larger sheet of glass and its sides need not be defined, as is the case where the strip forms part of a windscreen or other light. The width of the strip is normally greater than its thickness, both dimensions being considerably smaller than the length of the strip. The term "edge surface" as applied to the strip is used to denote the surface at the end of the strip; this surface may be flat and at right angles to the main surfaces of the strip, but may be at a rather different angle to the main surface or be somewhat curved.

From one aspect the present invention consists in a method of testing a piece of uniformly toughened glass comprising a substantially flat strip which terminates at one end in an edge surface, which method consists in causing a beam of light to pass lengthwise through the strip along a path which is inclined at a small angle to one of the main surfaces of the strip and extends from the strip through said edge surface and through said one main surface, the beam having a first component polarised in a direction parallel with said one main surface and a second component polarised in a direction at right angles to the first component, and passing the light emerging from the strip through an analyzer from which an output can be derived, the value of the output depending on the relative retardation of said components due to the internal stresses in the glass.

From another aspect of the invention there is provided apparatus for use in testing a piece of uniformly toughened glass comprising a substantially flat strip which terminates at one end in an edge surface, which apparatus comprises a device for generating a beam of polarized light, a principal transparent element and an end transparent element, both elements having substantially the same refractive index as the strip, the principal element having a surface adapted to engage one of the main surfaces of the strip and the end element having a surface adapted to engage said edge surface of the strip, the arrangement being such that a beam of polarized light from said device can pass through one of said elements through the strip and through the other of said elements along a path which is inclined at a small angle to said main surface and extends through said edge surface and through said main surface, the beam having a first component polarized in a direction parallel with said main surface and a second component polarised in a direction at right angles to the first component, and an analyzer adapted to receive the light after it has passed through the elements and the strip and from which an output can be derived, the value of the output depending on the relative retardation of said components due to the internal stresses in the glass.

Toughened glass is so formed as to have internal stresses, the central part of the glass being in tension and the outer part of the glass being in compression. In one method of production the glass is heated throughout so that it expands, and its surface is then rapidly chilled so that the outer part sets hard and is compressed as the central part subsequently cools and contracts. In another method of production the surface of the glass is treated chemically in such a manner as to introduce compressive stresses in the outermost layer or "skin" of the glass. The present invention is of use in testing both types of toughened glass.

In toughened glass the tensile and compressive forces are, of course, balanced. Nevertheless the compressive force at the surface is not necessarily equal and opposite to the tensile force at the centre, for the thickness of the surface layer which is in compression is usually less than the thickness of the underlying layer which is in tension. In particular the surface layer in chemically toughened glass is very much thinner than the underlying layer, with the result that the compressive force at the surface is very much greater than the tensile force at the centre.

For some purposes it is is desirable to know the value of the tensile stress at the centre of the glass, and as indicated above this cannot be readily determined by measuring the compressive stress at the surface. It has now been possible to show that the tensile stress at the centre of the glass is related to the relative retardation of the components of the beam of light described above. In addition it has also been possible to show that the particle count (as defined below) is related to the tensile stress at the centre of the glass, and is thus also related to said relative retardation.

When a piece of toughened glass is fractured it disintegrates into small pieces, and the term "particle count" is used to denote the number of pieces formed from a given area of the glass. British Standard 857:1967— Specification for Safety Glass for Land Transport—specifies certain ranges of particle count required for uniformly toughened safety glass for use as backlights and other body lights. Hitherto there has been no satisfactory method of determining the particle count of a piece of uniformly toughened glass which does not involve the fracture of the glass. Use of the present invention, however, enables an assessment of the particle count to be made by a non-destructive test.

In carrying out the method outlined above the beam of light is preferably caused to enter the glass through said main surface and to leave it through the edge surface, though the reverse method is possible. In order to enable the beam to pass through the main surface and travel in the glass at a small angle to the main surface it is normally necessary to cause the beam to pass through a transparent prism or like element lying against the main surface of the glass and having substantially the same refractive index as the glass, a thin layer of liquid, also of substantially the same refractive index as the glass filling any gap between the surface of the glass and the prism or other element. The prism or other element is preferably such that the beam of light enters it through a surface substantially normal to the beam.

Where the edge surface of the strip is a plane surface normal or substantially normal to the main surface of the strip the beam of light can leave the edge of the strip without distortion. Where the edge of the strip is curved, however, or is rough, it is generally necessary to provide a further transparent prism or like element, of substantially the same refractive index as the glass, which prism or like element lies against the edge surface of the strip; any gap between the edge surface and the prism or like element is filled with a liquid of substantially the same refractive index as the glass.

The two prisms or like elements may be combined in a single unit which presents two surfaces, at right angles to each other, one for engagement by the main surface of the strip and the other for engagement by the edge surface of the strip. Either or both prisms or like elements may be formed with a surface so positioned as to cause internal reflection of the beam during its path through the element. Any such reflecting surface may be silvered to improve its reflectivity.

The beam of light is preferably circularly or elliptically polarized, though plane polarized light may be used. As is well known a beam of circularly polarized light may be thought of as comprising two components, each component consisting of a beam of plane polarized light, the beams having the same amplitude as each other, the planes of the two components being at right angles to each other and the two components being 90° out of phase with each other. Thus when a beam of circularly polarised light is used in carrying out the invention it may be thought of as having one component polarized in a direction parallel with the one main surface of the strip of glass and the other component polarized in a direction at right angles to this. When plane polarized light is employed, it is necessary to ensure that the direction of polarization is inclined both to the main plane of the strip of glass and to the plane normal thereto, the inclination preferably being 45° to each of these planes. Thus when plane polarised light is used it is generally necessary to provide means for adjusting the direction of polarization, this necessity being avoided by the use of circularly polarized light.

The analyzer may be of any suitable type, and preferably comprises a compensator in conjunction with a circurally polarizing eyepiece.

White light or monochromatic light may be used.

The invention will now be more particularly described with reference to the accompanying drawings in which:

FIG. 1 is a diagrammatic representation of apparatus in accordance with the invention;

FIG. 2 illustrates what is seen by an observer looking through the eyepiece of the apparatus shown in FIG. 1 when the apparatus is being used to investigate the properties of a typical piece of uniformly toughened glass, and when the apparatus is used with monochromatic light rather than with white light;

FIG. 3 is a diagrammatic representation of another form of apparatus in accordance with the invention; and FIG. 4 is a diagrammatic section, to an enlarged scale, of one end portion of the piece of uniformly toughened glass shown in FIG. 1 as undergoing test, and including an indication of the position of the neutral or unstressed zone in the glass.

The apparatus shown in FIG. 1 comprises three main components; a device for generating a beam of circularly polarized light, a prism unit, and an analyzer.

The beam-generating device comprises a tubular housing 10 containing, in order along its length, a tungsten-filament bulb 11, a stop 12 with a pinhole through which light passes from the bulb 11, a collimating lens 13 which produces a parallel beam, and a circular polarizer 14.

The prism unit comprises two prisms 15 and 16 each made from clear glass. The refractive index of the prisms is preferably substantially the same as that of the toughened glass to be tested; this would not absolutely be essential, however, if monochromatic light were used. The first prism 15 is of elongated shape and is rectangular in cross-section. In a typical arrangement it is about seven inches long. One end 17 of the prism is normal to the longitudinal axis of the prism and the other end 18 is chamfered at 45° to this axis in such a manner that two of the opposed elongated faces of the prism are rectangular, one being longer than the other, while the other pair of opposed elongated faces are trapezium-shaped. In the particular orientation illustrated the rectangular faces are horizontal, the larger one being uppermost and the shorter one being lowermost, and the trapezium-shaped faces extend vertically between them. The second prism 16 is somewhat similar in shape to the first prism 15 but is considerably shorter in length. The prisms are arranged with the longitudinal axis of the first prism 15 horizontal and that of the second prism 16 vertical. The longer rectangular face of the first prism is uppermost so that the inclined face 18 is directed downwards. The longer rectangular face 19 of the second prism 16 abuts the non-inclined end 17 of the first prism, and the inclined face 20 of the second prism is directed away from the first prism.

The analyzer comprises a tubular housing 21 containing, in order along its length, an image-forming lens 22, a Babinet compensator 23 and a circular polarizing eyepiece 24 for viewing the image formed by the lens 22, the eyepiece 24 containing a fine line 25 (see FIG. 2) which is rotatable and of which the angular position can be determined by means of a suitable scale and pointer (not shown) on the eyepiece.

In use a sheet 26 of uniformly toughened glass to be tested is so positioned that a strip thereof lies beneath the first prism 15 with its edge surface abutting the longer rectangular face 19 of the second prism 16. A film of liquid, such as dimethylphthalate or cedarwood oil, having substantially the same refractive index as the glass is introduced between each prism and the glass. The beam-generating device is mounted in an upright position above the first prism 16 and in use directs a beam 27 of circularly polarized light into the first prism 15 so that it is internally reflected from the inclined face 18 thereof. The beam 27 enters the prism 15 at a small angle to the vertical and the arrangement is such that after reflection the beam travels almost horizontally along the first prism towards the second prism 16 but shortly leaves the first prism and travels through the strip of glass 26 to be tested. The beam 27 is here at a small angle to the main surface of the strip which touches the first prism 15, the angle usually being about 5° or a little more. It is preferred to use as small an angle as possible, but it is found that due to differences in the refractive indexes of the prism 15, the glass 26 and the intermediate liquid layer, it is not normally practicable to use an angle much smaller than 5°. Above about 10° the results obtained are less accurate than with smaller angles, and it is therefore preferred to use angles not greater than 10°. The beam 27 leaves the strip of glass through that edge surface abutting the second prism 16, and passes through the second prism, being reflected upwards from the inclined surface 20 and leaving the horizontal upper end face of the prism in an almost vertical direction. The beam then passes into the analyzer which is mounted above the second prism co-axially with the beam.

The Babinet compensator 23 is so arranged that the horizontal band of the beam of light 27 leaving the glass at any particular depth below the top of the glass extends at right angles to the neutral line of the compensator, that is the centre line along which the compensator has no effect on the light transmitted through it. Thus if an unstressed piece of glass were substituted for the toughened glass 26 being tested a straight black fringe, along the neutral line of the compensator, would be visible in the eyepiece (provided that the relative orientation of the circular polarizers 14 and 24 was correct). One end of the fringe would represent a point at the top of the edge surface of the strip of glass, and the other end of the fringe would represent a point at the bottom of the edge surface. The presence of a single black fringe would be due to the use of white light. If monochromatic light were used there would be a plurality of uniformly spaced parallel fringes.

When a strip of toughened glass is used the black fringe is distorted. Provided that the stress in a plane at any level in the glass is uniform over the whole of that plane the fringe is distorted into an S-shaped configuration, there being no distortion of the fringe at those points corresponding to the top, bottom and center of the edge surface of the glass, while the upper part of the fringe is bowed to one side of the neutral line and the lower part of the fringe is bowed to the other side thereof. FIG. 2 illustrates what is seen by an observer looking through the eyepiece of the apparatus shown in FIG. 1, when the apparatus is used with monochromatic light rather than with white light. The field of view includes a narrow strip 28 at the top produced by light which passes through the prisms 15 and 16 just above the sheet of glass 26, a broad strip of S-shaped fringes produced by light which passes through the sheet of glass and leaves through the end surface thereof. These conditions are clearly not true in practice, however, as the part of the strip near the edge surface, often referred to as the "rind," is in compression rather than in tension. Nevertheless, the effects due to the presence of the rind can be allowed for and in any case are generally small, particularly near the centre of the edge surface.

FIG. 4 is a diagrammatic section through one end portion of the piece of glass 26 and shows the beam of light 27 passing through the glass at a small angle to the main surfaces 29 and 30 of the glass. The outer part 31 of the glass is in compression and the inner part 32 is in tension, and the two parts are separated by a neutral or unstressed zone indicated by the line 33. Most of the central plane, indicated by the line 34, is in the maximum state of tension, but the tension is less near the edge surface 35 of the glass, and it is this less highly stressed portion and the portion immediately adjacent to the surface 35, which are referred to as the "rind."

It can be shown that the rate of change of relative retardation with respect to the glass thickness, and which is a function of the angle $\alpha$ at which the central black fringe crosses the neutral line of the compensator, is equal to $C\sigma_t \cot \theta$ where $C$ is the stress optic co-efficient, $\sigma_t$ is the tensile stress at the centre of the glass and $\theta$ is the small angle at which the beam traverses the glass. Assuming that $C$ and $\theta$ are known it is thus possible to determine $\sigma_t$ from a measurement of the angle at which the central black fringe crosses the neutral line of the compensator, this angle being readily determined with the aid of the rotatable line 25 in the eyepiece 24 of the analyzer. Where white light is used there is only a single black fringe. To determine the angle at which this crosses the neutral line of the compensator a sheet of unstressed glass is inserted in the apparatus and the rotatable line 25 in the eyepiece is aligned with the straight black fringe and its angular position is noted. The unstressed glass is replaced by the sheet of toughened glass 26 and the line is rotated until it is aligned with the central part of the S-shaped curve whereupon its angular position is again noted. A similar procedure is adopted when monochromatic is used, but here the rotatable line 25 can be adjusted so as to be parallel with the group of lines which is visible rather than with any one particular line. In each case the angular position of the rotatable line 25 when aligned with the straight fringe or fringes need only be determined and checked occasionally. As it is difficult to determine $\theta$ accurately by direct observation it is preferred to calculate it from measurements of the distortion of the black fringe when an untoughened strip of glass of known thickness is substituted for the toughened strip and is subjected to a predetermined bending stress.

If desired other related measurements of the fringe or fringes may be made, and these used to determined the tensile stress at the centre of the glass. Further, as indicated above, it is possible to assess the particle count of the glass as for any particular type of glass this appears to be a function only of the tensile stress at the centre of the glass and the thickness of the glass. Because the angle at which the black fringe crosses the neutral line of the compensator is also a function of the tensile stress it is possible to calibrate the apparatus in such a manner that for any particular type of glass and glass-thickness the angular scale is replaced by a scale reading directly in terms of the particle count.

A modified form of apparatus is shown in FIG. 3. The beam-generating device here comprises a source of monochromatic light, namely a mercury vapour lamp 40 of the kind having a small source, a collimating lens 41, a surface-coated mirror 42, and a circular polarizer 43. The prism unit comprises two prisms 44 and 45 similar to the prisms 15 and 16 respectively, but inverted. The analyzer comprises an imaging leans 46, a surface-coated mirror 47, a Babinet compensator 48, a Ramsden eyepiece 49, incorporating another circular polarizer, and a screen 50. In use a beam of light 51 passes through the apparatus, following the line indicated, and an image of the fringes is projected onto the screen 50. A particular advantage of this apparatus is that the sheet of glass 52 to be tested can readily be placed on top of the prism 44 and pushed into contact with the prism 45.

In the foregoing description it has been assumed that the strip of glass being tested is absolutely flat. In fact it is not essential for it to be absolutely flat, and the only requirement is that any gaps between the strip and the longer prism can be filled with a liquid having substantially the same refractive index as that of the glass and the prism. Thus the apparatus may be used in testing curved windscreens or backlights.

What I claim is:

1. A method of testing a piece of uniformly toughened glass of the kind comprising a substantially flat strip which terminates at one end in an edge surface, which method consists in causing a beam of light to pass lengthwise through the strip along a path which is inclined at a small angle to one of the main surfaces of the strip, the light-path also extending through a transparent element immediately adjacent to said one main surface, and passing the beam having a first component polarized in a direction parallel with said one main surface and a second component polarized in a direction at right angles to the first component, and passing the light emerging from the strip through an analyzer from which an output can be derived, the value of the output depending on the relative retardation of said components due to the internal stresses in the glass, the method being characterized in that the light path extends through an edge surface at one end of the strip of glass and in that the light passed through the analyzer is light which has passed directly along the light-path.

2. A method according to claim 1 characterized in that the beam of light enters the strip of glass through said main surface and leaves through said edge surface.

3. A method according to claim 1 characterized in that the light-path extends through an end element of substantially the same refractive index as the strip immediately adjacent to said edge surface, said edge surface being non-planar, and optical continuity between the strip and the end element being maintained by liquid of substantially the same refractive index as the strip between the strip and the element.

4. Apparatus for use in testing a piece of uniformly toughened glass and of the kind comprising a device for generating a beam of polarized light, two transparent elements having substantially the same refractive index as the piece of glass, one of said elements, the principal element, having a surface adapted to engage one if the main surfaces of the piece of glass, the arrangement being such that a beam of polarized light from said device can pass through the principal element and through the piece of glass along a path which is inclined at a small angle to said main surface, the beam having a first component polarized in a direction parallel with said main surface and a second component polarized in a direction at right angles to the first component, and an analyzer adapted to receive the light after it has passed through the elements and the piece of glass and from which an output can be derived, the value of the output depending on the relative retardation of said components due to the internal stresses in the glass, the apparatus being characterized in that while the principal element is adapted to engage one of the main surfaces of the piece of glass the other element, or end element, is adapted to engage an end surface of the piece of glass so that in use the light path extends through said end surface and said end element.

5. Apparatus according to claim 4 in which the principal element abuts the end element, and the end element has a planar surface adapted to engage an end surface of the piece of glass, said planar surface being at right angles to said surface of the principal element adapted to engage one of the main surfaces of the piece of glass.

References Cited

UNITED STATES PATENTS

| | | | |
|---|---|---|---|
| 1,514,386 | 11/1924 | Hitner | 356—239 |
| 2,995,060 | 8/1961 | Acloque | 356—35 |
| 3,286,581 | 11/1966 | Acloque et al. | 356—35 |

OTHER REFERENCES

Comptes Rendus, "Sur l'onde de reflexion totale," Guillemet et al., vol. 250, June 1960, pp. 4328–4330.

RONALD L. WIBERT, Primary Examiner

O. B. CHEW II, Assistant Examiner